UNITED STATES PATENT OFFICE.

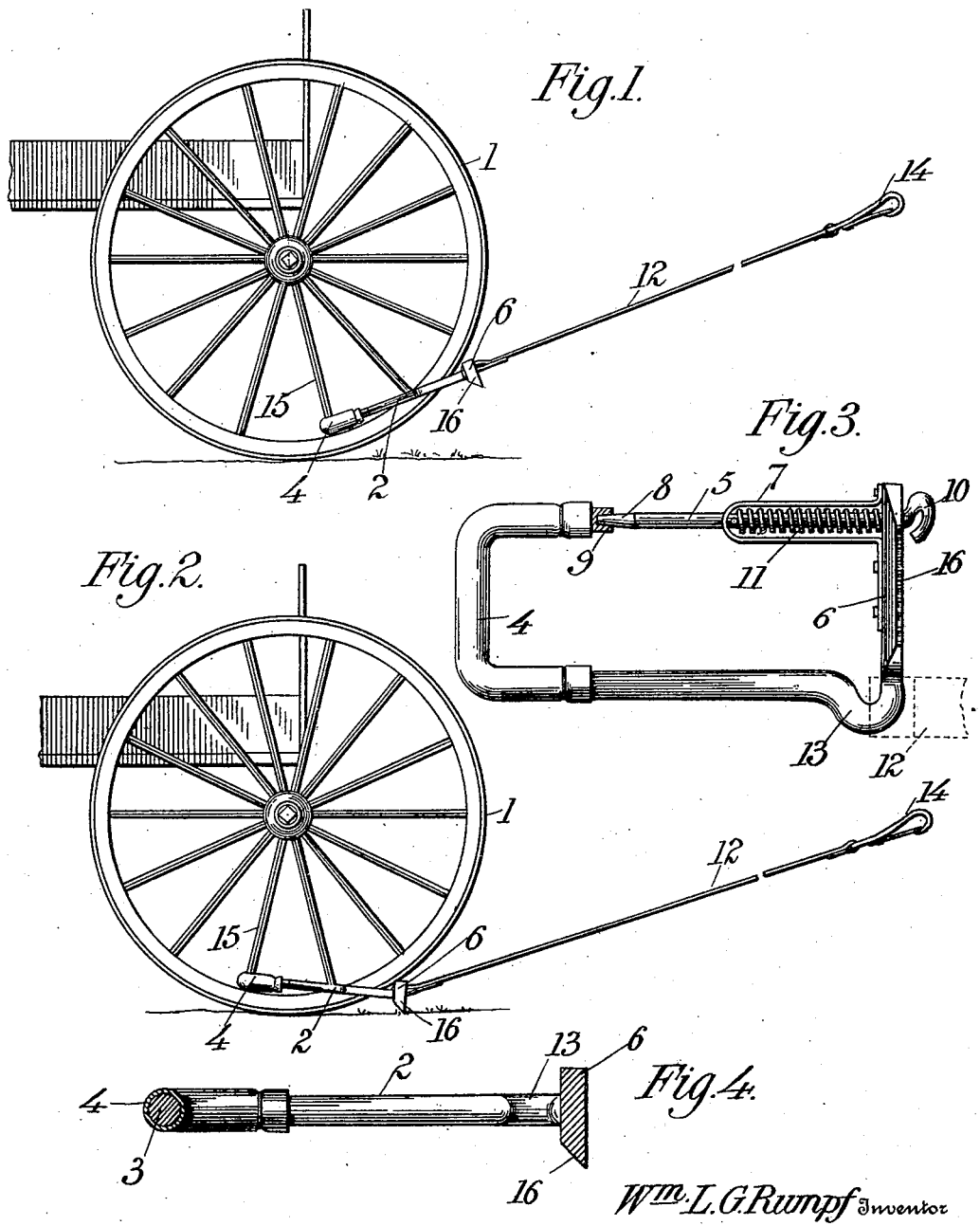

WILLIAM L. G. RUMPF, OF CHICAGO, ILLINOIS.

HORSE-CHECKING DEVICE.

SPECIFICATION forming part of Letters Patent No. 680,361, dated August 13, 1901.

Application filed April 4, 1901. Serial No. 54,314. (No model.)

*To all whom it may concern:*

Be it known that I, WILLIAM L. G. RUMPF, a citizen of the United States, residing at Chicago, in the county of Cook and State of Illinois, have invented certain new and useful Improvements in Horse-Checking Devices; and I do declare the following to be a full, clear, and exact description of the invention, such as will enable others skilled in the art to which it appertains to make and use the same.

My invention relates to a device for checking and preventing horses from running away—a device which when the driver leaves his horse standing may be easily and quickly attached to the front wheel of his vehicle and the bit-ring of the bridle, so that should the horse start off during the driver's absence the rotation of the wheel will draw upon the check-strap and bring the animal to a stop.

The object of the invention is to provide a device of this character which shall be simple of construction, durable in use, comparatively inexpensive of production, and efficient in action and provided with means adapted when the front wheel has moved to a certain extent to be forced into the ground to serve as an anchor to prevent dragging of the vehicle.

With this and other objects in view the invention consists of certain novel features of construction and combination and arrangement of parts, which will be hereinafter more fully described, and particularly pointed out in the appended claims.

In the accompanying drawings, Figure 1 is a side elevation showing the application of the invention to a vehicle-wheel. Fig. 2 is a similar view showing the wheel turned to bring the device into position for the anchor-teeth thereof to be forced into the ground. Fig. 3 is a bottom plan view of the frame of the checking device, and Fig. 4 is a central vertical longitudinal section of the same.

In the drawings, 1 denotes one of the front wheels of a vehicle, and 2 my improved checking device. The device consists of an oblong rectangular frame, the rear cross-bar 3 of which forms a bearing portion to engage a spoke of the wheel and is provided with a sleeve or sheathing 4, of rubber or other soft yielding cushioning material, to prevent injury to the spokes and rim of the wheel. The forward portion of one side of this frame is closed by a bolt 5, which is mounted to slide in the front cross-bar 6 of the frame and in a U-shaped housing 7, secured to said front cross-bar. The rear end 8 of this bolt is pointed to seat within a recess or socket 9 in the frame, and the front end thereof is formed with a finger-piece 10, by which it may be conveniently slid forwardly to open the frame for engagement with the spokes of the wheel. A spring 11 is inclosed within the housing and exerts its energy to force the pointed end of the bolt into its socket. 12 denotes the hitch-strap, which is connected to an offset 13 of the frame and has at its free end a snap-hook 14, which is adapted to be connected with the bit-ring of the bridle.

The device is connected to the wheel 1 of the vehicle by withdrawing the spring-actuated bolt from its socket 9 to its fullest extent and then slipping the frame in position upon the wheel in the manner shown in Fig. 1, so that the cushion-covered rear cross-bar 3 will bear upon the rear surface of a lower spoke 15, located immediately in advance of the vertical center of the wheel. The snap-hook is now engaged with the bit-ring of the bridle, the length of the strap being a little greater than the distance between the bit-ring and said spoke 15, so that the strap will hang slightly slack. Should the animal now start off, the tendency would be to draw his head backward, for the reason that in the rolling of the wheel the hitch-strap is drawn rearwardly as the spoke 15, with which the device is engaged, passes to the rear of the vertical center of the wheel. The wheel would then be locked against rotation by the hitch-strap and check device and prevent the vehicle from being moved forward unless it should be dragged by the animal pulling the load with his head. To obviate this, I provide the front cross-bar 6 with downwardly-projecting teeth 16, which when the spoke 15 reaches the limit of its rearward movement are forced into the ground by the pressure of the wheel riding over upon the cross-bar 6 and forcing the latter downward, the teeth thus acting as anchors to prevent the wheel from being dragged. Fig. 2 of the drawings shows the spoke 15 nearing the limit of its rearward movement and the cross-bar 6 about to pass under the wheel, from which the operation of the device will be readily understood.

Having thus particularly described my invention, what I claim as new, and desire to secure by Letters Patent, is—

1. In a device of the character described, the combination with a hitch-strap, of a checking device comprising a frame, and means for connecting the frame to the spoke of a wheel, said frame being provided with downwardly-projecting anchor-teeth, substantially as described.

2. In a device of the character described, the combination with a hitch-strap, of a checking device comprising a frame, and means for connecting the frame with the spoke of a wheel, said means consisting of a spring-actuated bolt, said frame being provided with an elastic cushion to prevent abrasion, and at one end with downwardly-projecting anchor-teeth, substantially as described.

3. In a device of the character described, the combination with a hitch-strap, of a checking device consisting of an oblong rectangular frame provided with a cushion upon its rear cross-bar and with downwardly-projecting teeth on its front cross-bar, said frame being open at one side, a housing connected to the front cross-bar, a bolt sliding in said housing to close the open side of the frame, and a spring encompassing the bolt within the housing for holding said bolt closed, substantially as described.

In testimony whereof I have hereunto set my hand in presence of two subscribing witnesses.

WILLIAM L. G. RUMPF.

Witnesses:
ROBERT J. FRANK,
HENRY F. WALTER.